(12) United States Patent
Tvedt et al.

(10) Patent No.: US 11,547,103 B2
(45) Date of Patent: Jan. 10, 2023

(54) FISHING TOOL FOR BOTTOM-DWELLING MARINE ORGANISMS, FOR FISHING ICELAND SCALLOPS, OTHER SCALLOPS AND POTENTIALLY OTHER BOTTOM SPECIES SUCH AS SEA CUCUMBERS, SEA URCHINS, OTHER TYPES OF SHELLFISH AND SPECIES OF CRAB

(71) Applicant: Tau Tech AS, Ålesund (NO)

(72) Inventors: Øystein Tvedt, Ålesund (NO); Bernt Rogne, Ålesund (NO); Bjørn Roppen, Ulsteinvik (NO); Sverre Olav Farstad, Ålesund (NO); Jan Rogne, Ålesund (NO); Karl Fredrik Sandvik, Hareid (NO)

(73) Assignee: Tau Tech AS, Ålesund (NO)

( * ) Notice: Subject to any disclaimer, the term of this patent is extended or adjusted under 35 U.S.C. 154(b) by 224 days.

(21) Appl. No.: 16/756,344

(22) PCT Filed: Oct. 24, 2018

(86) PCT No.: PCT/NO2018/050255
§ 371 (c)(1),
(2) Date: Apr. 15, 2020

(87) PCT Pub. No.: WO2019/083375
PCT Pub. Date: May 2, 2019

(65) Prior Publication Data
US 2020/0323183 A1    Oct. 15, 2020

(30) Foreign Application Priority Data
Oct. 25, 2017   (NO) ................................... 20171710

(51) Int. Cl.
*A01K 80/00*    (2006.01)
*E02F 3/92*     (2006.01)

(52) U.S. Cl.
CPC ................ *A01K 80/00* (2013.01); *E02F 3/92* (2013.01)

(58) Field of Classification Search
CPC ..................................................... A01K 80/00
See application file for complete search history.

(56) References Cited

U.S. PATENT DOCUMENTS

| 2,204,584 A * | 6/1940 | Flower .................... E02F 7/065 299/9 |
| 2,672,700 A * | 3/1954 | Hanks, Jr. .............. A01K 80/00 56/9 |

(Continued)

FOREIGN PATENT DOCUMENTS

| CN | 103719048 A | 4/2014 |
| CN | 105961344 A1 | 9/2016 |

(Continued)

OTHER PUBLICATIONS

International Search Report and Written Opinion for corresponding Patent Application No. PCT/NO2018/050255 dated Jul. 1, 2019.

(Continued)

*Primary Examiner* — Richard G Davis
(74) *Attorney, Agent, or Firm* — Renner, Otto, Boisselle & Sklar, LLP

(57) ABSTRACT

A harvesting unit with one or more pumps including one or more suction nozzles directed towards the seabed, one or more inlets that lead from the suction nozzle to the pump, an outlet to a sorting device, one or more motors for driving the one or more pumps, where the sorting device, which at least separates shellfish from bycatch and foreign bodies, has an outlet for shellfish leading to a collecting unit, a structural main frame that carries at least the harvesting unit, and a towing and launching system for deployment and propulsion of the harvesting unit.

23 Claims, 5 Drawing Sheets

(56) References Cited

U.S. PATENT DOCUMENTS

| | | | |
|---|---|---|---|
| 3,521,386 A * | 7/1970 | Francklyn | A01K 80/00 299/8 |
| 3,783,536 A | 1/1974 | Hanks | |
| 4,779,404 A * | 10/1988 | Bell | A01D 44/00 56/9 |
| 2003/0172557 A1 | 9/2003 | Myers, Jr. | |
| 2005/0160655 A1 * | 7/2005 | Oorschot | A01K 80/00 43/6.5 |
| 2010/0126047 A1 * | 5/2010 | Drabble | E02F 3/9293 37/324 |

FOREIGN PATENT DOCUMENTS

| | | |
|---|---|---|
| FR | 2735329 A | 8/1997 |
| GB | 1156547 A | 6/1969 |
| GB | 1207906 A | 10/1970 |
| GB | 2335935 A | 10/1999 |
| JP | S5486597 U | 6/1979 |
| JP | S5989798 U | 6/1984 |
| JP | 3138739 U | 1/2008 |
| NO | 333031 B1 | 2/2011 |
| NO | 20092836 A1 | 2/2011 |
| RU | 2084372 C1 | 7/1997 |
| SU | 158178 A1 | 10/1963 |
| WO | 2003088742 A | 10/2003 |
| WO | 2011019290 A | 2/2011 |
| WO | 2016096832 A1 | 6/2016 |

OTHER PUBLICATIONS

Translation of Russian Search Report completed Dec. 17, 2021, for corresponding Russian Patent Application No. 2020116805.
Japanese Notification of Reasons for Refusal dated Oct. 18, 2022, for co-pending Japanese Patent Application No. 2020-543456.

* cited by examiner

FISHING TOOL FOR BOTTOM-DWELLING MARINE ORGANISMS, FOR FISHING ICELAND SCALLOPS, OTHER SCALLOPS AND POTENTIALLY OTHER BOTTOM SPECIES SUCH AS SEA CUCUMBERS, SEA URCHINS, OTHER TYPES OF SHELLFISH AND SPECIES OF CRAB

This application is a national phase of International Application No. PCT/NO2018/050255 filed Oct. 24, 2018 and published in the English language, which claims priority to Norway Application No. 20171710 filed Oct. 25, 2017, both of which are hereby incorporated herein by reference.

INTRODUCTION

The Iceland scallop is a shellfish (a species of scallop) that is found in large concentrations lying on the seabed in Norwegian waters. Today it is fished chiefly off northeastern USA and Canada. Its natural habitat in Norway is around Jan Mayen, in the Barents Sea close to Svalbard, along the coast of Troms and Vesterålen and in small local stocks off western Norway. However, fishing for Iceland scallops is carried out on a very modest scale in Norway. This is primarily due to the fact that to date no suitable method has been found for harvesting scallops from the seabed. From 1986 to 1992 some large-scale fishing of Iceland scallops was carried out in Norway, comprising trawling along the seabed. This turned out to be a highly lucrative and profitable method of fishing. At the same time, it was found that the fishing method of trawling along the seabed was both highly inefficient and non-sustainable for the environment and the stocks. Shellfish dredging taxes the fishing grounds in question 100%. This harvesting method was terminated and declared illegal by the authorities in the early 1990s. Since then, no one has found a technological solution for sustainable large-scale harvesting of Iceland scallops.

In Norway today there is no solution for large-scale fishing of Iceland scallops. They are fished in small quantities through diving. This is ineffective, relatively costly and seasonal. In addition, it entails a potential for accidents owing to limited light, the cold and weather conditions. The only known technology for fishing Iceland scallops is bottom trawling. Bottom dredging for shellfish is a poor solution since the dredging is done at the expense of the seabed environment. As mentioned above, this method is prohibited in Norway. As a solution, trawling is also far less efficient than the proposed solution. When trawling, perhaps as much 95% of that brought on board will be rocks, sand and bycatch. In addition, as much as about 70% of the catch will be damaged by trawling. It is also a method that is not sustainable for the Iceland scallop stock as the seabed is scraped and damaged during fishing.

The invention is a solution to the aforementioned problems and is a gentle harvesting method both for the environment and for marine ecosystems. Species that are not to be caught are carefully sorted out. In addition, very small shellfish will also be sorted out and allowed to continue to grow and contribute to maintaining the stock in a much better way than by trawling where the entire catch is brought aboard the vessel.

BACKGROUND ART

Patent publication JPH0643A describes a system for gathering shellfish from the sea bottom where the shellfish are first loosened from the bottom and then brought onto the deck of a vessel. A pipe, a nozzle and an inlet are fixed to a sledge-like assembly with a shoe comprising support stays. Shellfish that are on the seabed are loosened therefrom with the aid of high-pressure fluid, sucked up with the aid of a negative pressure generated by blades/vanes and brought to the surface in a fluid flow and then carried further via a lift pump.

Patent publication JPS5486597U describes a system where the shellfish are loosened from the seabed with the aid of a plurality of high-pressure nozzles. The shellfish are then sucked through a hose connection up to the sea surface and finally they are stored in a container on the vessel. The system consists of a sledge-like object with shoe, struts and a plurality of nozzles. The nozzles are supplied with fluid from a pump on the vessel via a hose. The collecting system on the seabed comprises a sledge designed to be dragged along the seabed with the aid of a towrope that is attached to the vessel.

Norwegian Patent NO333031 describes a device for collecting objects from the seabed using a ROV, or a hydraulic arm controlled from a surface vessel, where the device is installed on a ROV/hydraulic arm and consists of a nozzle, a suction chamber, an underpressure pump and an exhaust system, and uses suction to collect objects, and has a nozzle specially constructed for collecting a specific object.

GB2332848A describes an apparatus for harvesting shellfish on the seabed, which comprises a cage and a blade mounted on a frame that is adapted to be towed along the seabed. A feed pipe discharges fluid under high pressure adjacent to the blade to produce turbulence and a suction pipe removes material collected in the cage. The blade is adapted to free the catch from the seabed and is adjustable so that the angle and depth of penetration of the blade can be altered. The suction pipe preferably operates as an air lift pump.

GB1207906A teaches a suction dredging apparatus for the harvesting of molluscs and the like. The apparatus includes dredge means for collecting molluscs from the seafloor, collecting means that define channels of travel for molluscs, means for supplying high-pressure gas to guiding means at a point adjacent the dredge means whereby the buoyancy and velocity of the said gas induce a movement of the molluscs through the said channels.

GB1156547A teaches a marine dredge that takes molluscs up from the seafloor and transports them continuously to a surface vessel that tows the dredge.

US Patent Application US2003/172557A1 teaches an apparatus for harvesting shellfish from the seabed, comprising a source of pressurised water, at least one water jet arranged to receive water from the water source and direct it at shellfish-containing sediments, sorting plates for receiving the shellfish-containing sediments excavated by the at least one water jet and separating the shellfish from the sediments, a collection chamber for receiving the separated shellfish and dual lifting compartments, one of which is connected to the pressurised water source for lifting shellfish from the collection chamber and entraining the shellfish for transport to the surface, and the other of which is arranged to receive pressurised air for increasing the transport speed and lifting power whilst cushioning the shellfish as they are transported to the surface.

U.S. Pat. No. 2,204,584A teaches an apparatus that removes material such as oysters, shellfish etc. from the seabed, consisting of hydraulic dredging that brings a water flow into a nozzle and through a vertical passage whilst the nozzle is directed towards the seabed in order to remove the said material, this being suspended in and brought up with the water flow through the passage and up to, e.g., a surface vessel where it is collected and stored.

U.S. Pat. No. 3,783,536A teaches an apparatus that collects biological or geological material from the seafloor, which comprises a surface vessel, a downwardly depending conduit, a second conduit arranged in the first downwardly depending conduit, and a first and second endless belt conveyor disposed within the said conduit, a suction pump arranged on the surface vessel, and the upper part of the second conduit is connected to the suction pump inlet.

FR2735329A describes fishing gear consisting of an underwater frame that is attached to a fishing vessel that drags it along the seabed. The underwater frame carries a guide and a suction head that is positioned towards the forward part of the frame and creates a vacuum that carries material from the seabed onto a platform located at a certain fixed distance from the forward frame part. A carrier above and in front of the suction head forms a support for the upper edge of the net and enables the living organisms that pass over the suction head to be caught. A transport duct transfers the living organisms (that are caught by both apparatus) from the underwater frame and up to the surface vessel.

A common feature of the collecting gear that drags a frame with suction along the seabed is that it stirs up large amounts of bottom sediment, it damages the seabed fauna and "makes a clean sweep" so that the seabed over which the harvesting gear has been dragged is left with significant damage. This type of harvesting method has been terminated and declared illegal by the Norwegian authorities.

The present invention is thus intended to solve two problems:
1. Efficient harvesting method: the current method used is manual harvesting by divers; this is risky and time-consuming as Iceland scallop harvesting can take place at depths as great as 200 metres. The invention differs from hand-picking and suction up to buckets on the sea surface.
2. Prevent damage to the seabed during harvesting. The invention differs from earlier harvesting methods that caused extensive or irreparable damage to the seabed, which takes a long time to reverse.

BRIEF SUMMARY OF THE INVENTION

The present invention solves the aforementioned problems and is a harvesting system for bottom-dwelling marine organisms (Iceland scallops, other scallops or similar organisms), comprising a harvesting unit (0) having the following features: one or more pumps comprising one or more suction nozzles directed towards the seabed; one or more inlets leading from the suction nozzle to the pump; an outlet to a sorting device; one or motors for driving the one or more pumps, where the sorting device, which at least separates shellfish from bycatch and foreign bodies, has an outlet for shellfish leading to a collecting unit, a structural main frame that carries at least the harvesting unit and a towing and launching system for deployment and propulsion of the harvesting unit.

The invention further describes a method for harvesting shellfish from a seabed comprising the following steps:
  lowering a harvesting unit from a vessel via a towing and launching system down to the seabed;
  sucking up shellfish via one or more suction nozzles directed towards the seabed with one or more pumps that are arranged in the harvesting unit;
  separating shellfish from bycatch and foreign bodies using a sorting device;
  passing the shellfish to a collecting unit;
  towing the harvesting unit is along the seabed with the aid of the towing and launching system, and further,
  controlling and adjusting the position of the suction nozzles, the position of the harvesting unit relative to the seabed and required suction force or flow from the pumps as a function of the harvesting rate.

The harvesting unit has simple technical solutions, which means that no special competence is required to operate or repair the equipment during fishing.

EXPLANATION OF THE FIGURES

The figures show some embodiments of the claimed invention, but the invention is not limited to the embodiments shown in the figures.

EMBODIMENTS OF THE INVENTION

The inventive device is a solution to the aforementioned problems and needs and is a harvesting system for bottom-dwelling marine organisms (Iceland scallops, other scallops or similar organisms) comprising a harvesting unit having the following features: one or more pumps comprising one or more suction nozzles directed towards the seabed, one or more inlets leading from the suction nozzle to the pump, an outlet to a sorting device, one or more motors for driving the one or more pumps, where the sorting device, which at least separates shellfish from bycatch and foreign bodies, has an outlet for shellfish leading to a collecting unit, a structural main frame that carries at least the harvesting unit, and a towing and launching system for deployment and propulsion of the harvesting unit.

Figure 1:
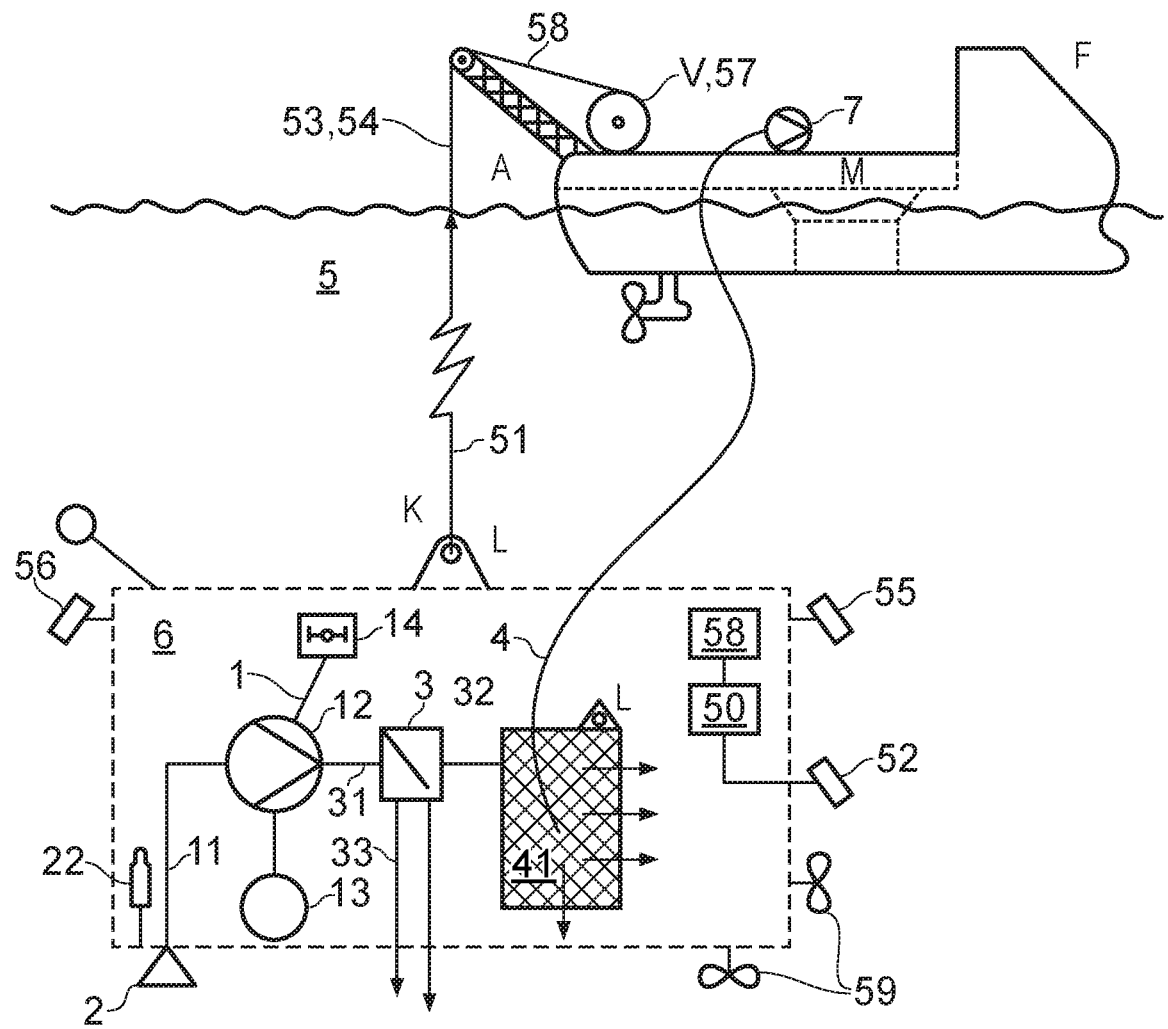
FIG. 1 is a schematic diagram of the whole concept according to an embodiment of the invention, including the vessel or mother ship and the harvesting unit, which shows how the harvesting method works.
Figure 2:
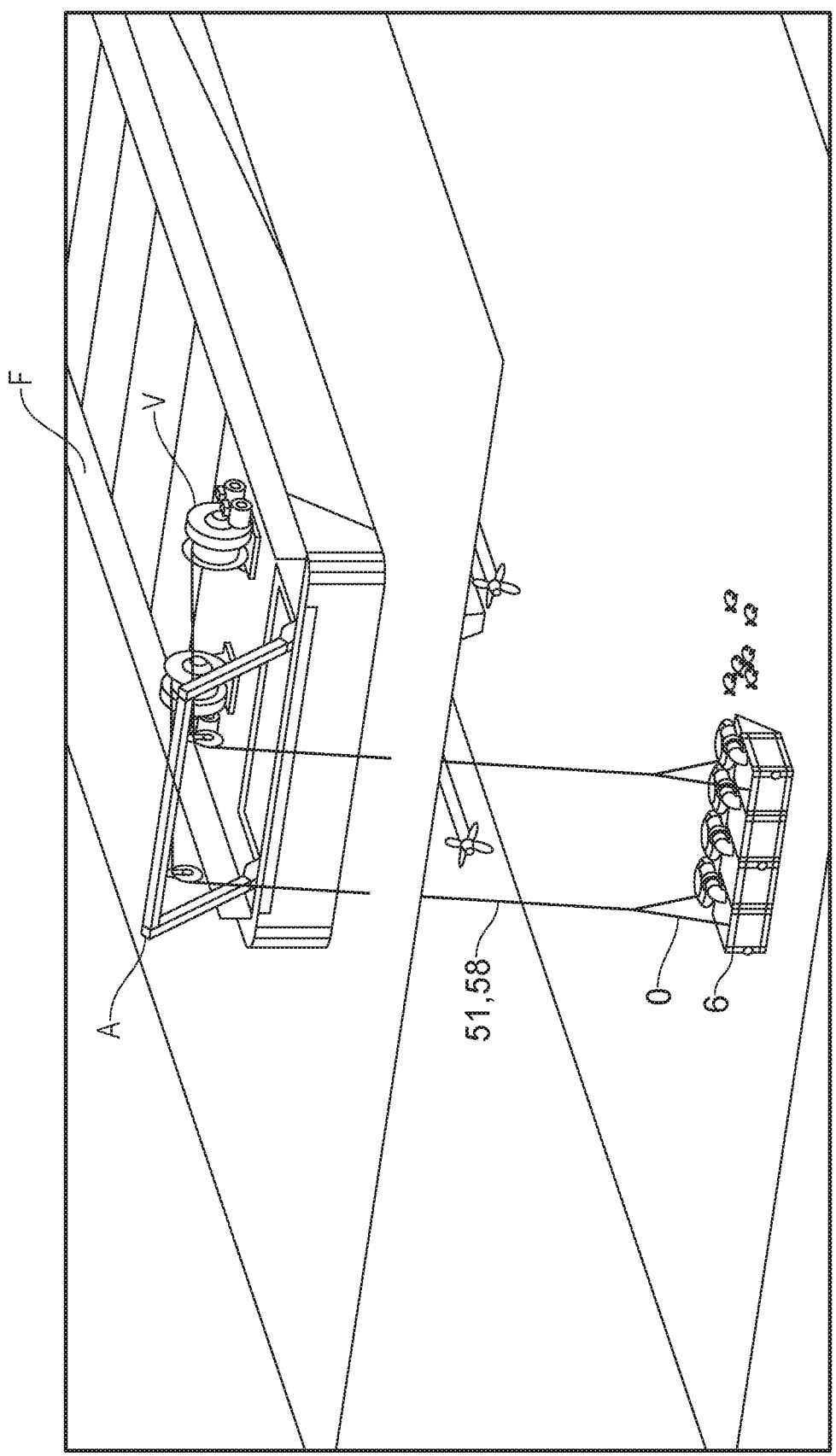
FIG. 2 shows the assembly of an embodiment of the harvesting unit and parts of the towing vessel.
Figure 3:
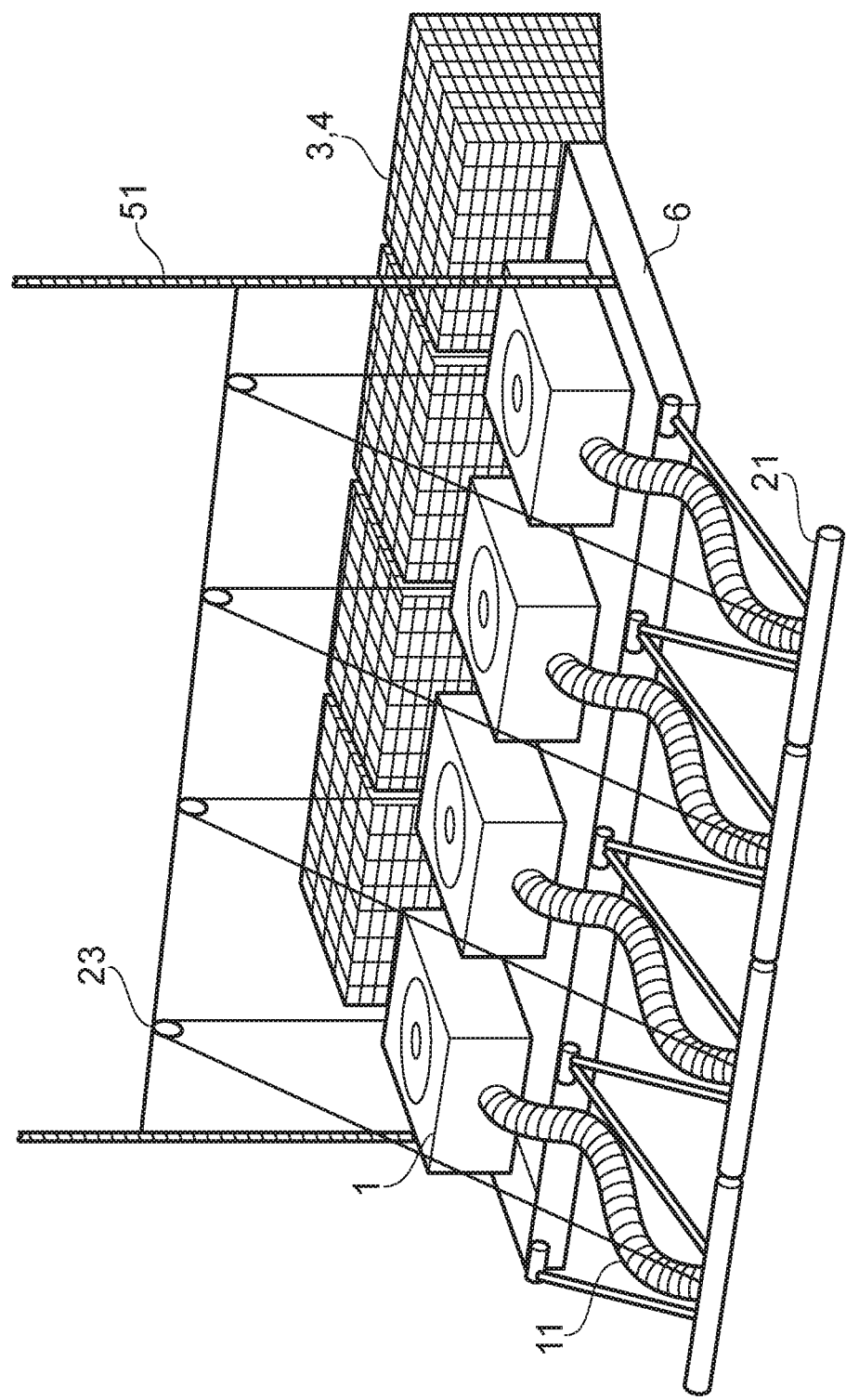
FIG. 3 shows an arrangement of an embodiment of the harvesting unit mounted on a frame.
Figure 4:
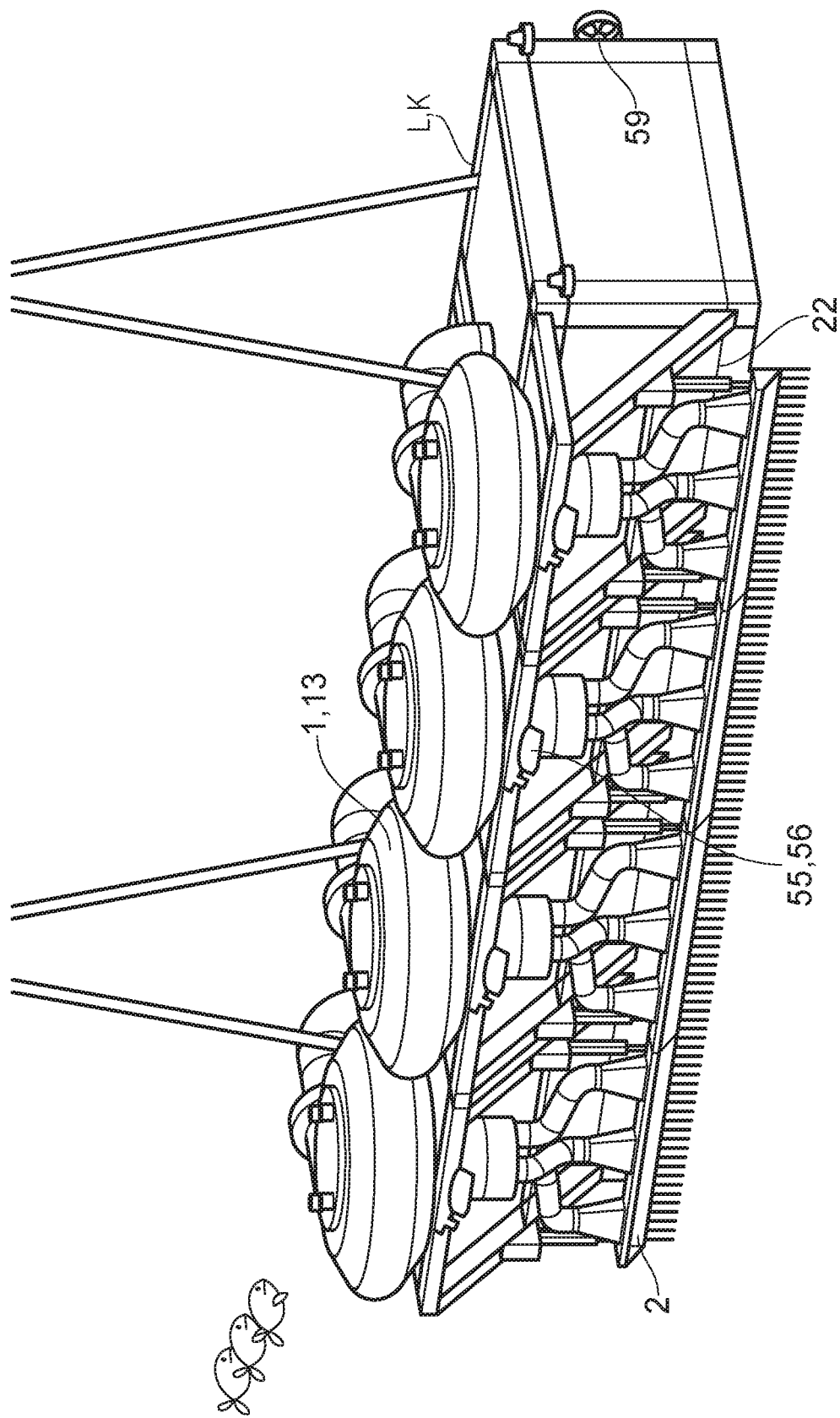
FIG. 4 shows an embodiment of the invention with an arrangement where the harvesting unit is mounted on a frame.
Figure 5:
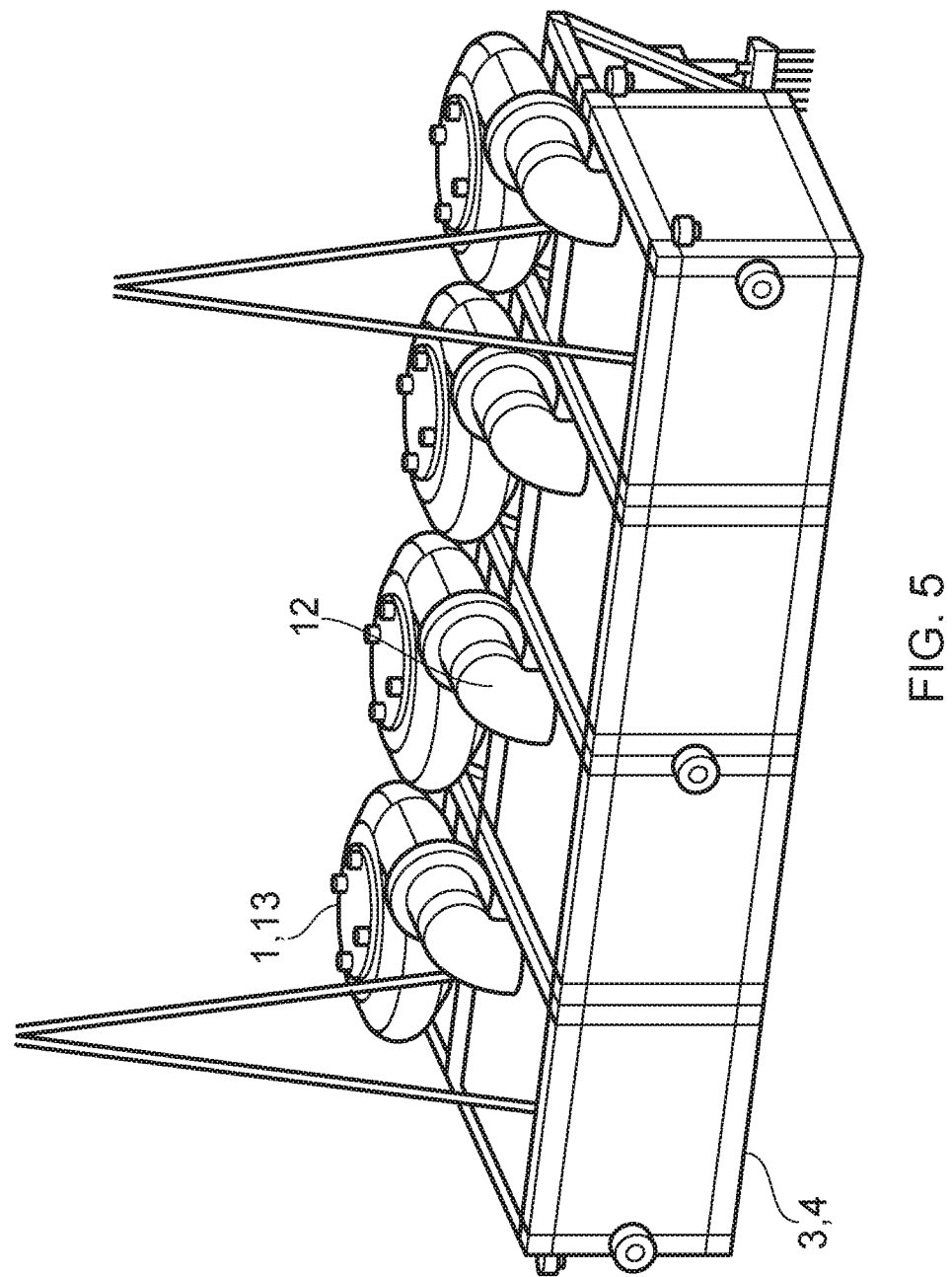
FIG. 5 shows in an embodiment of the invention an arrangement (in rear view) of the harvesting unit in FIG. 4 mounted on a frame.

The harvesting system is shown in FIG. 1 in a simple schematic diagram. The system is intended to harvest and sort, for example, shellfish from the seabed before they are transported in baskets, which may be perforated cages or crates, up to a vessel (F). The unit for contact-free harvesting of, for example, shellfish from the seabed consists of a plurality of pump units (1) that create an underpressure in the suction nozzles. This underpressure will suck the shellfish into the hoses connected to the suction nozzles, and from there the shellfish will be sucked through the pump (1) and pass through a separator (3) where any undesired objects can be filtered off (separates shellfish from bycatch and foreign bodies such as rocks, seaweed and debris). The filtered shellfish are passed through a tube or passage (33) or dumped straight out from the separator (3) back onto the seabed. The sorted shellfish ultimately end up in one or more collecting bins, chambers or baskets (4). The collecting chamber (4) is a device that is geometrically delimited and functions as a store for the catch. The baskets (4) can be taken up to the surface one at a time and emptied independently of the rest of the unit. The baskets (4) and the harvesting unit (0) are provided with lifting devices (L). Lifting the baskets (4) can be done with the aid of a coupling device (K), which may, for example, be a part of the towlines (51). The suction nozzles (2) can be raised/lowered with the aid of electric or hydraulic actuators to adapt to the topology of the seabed and a camera and lights will be mounted on the harvesting system to allow full operator control. The harvesting unit cannot be moved independently of the vessel (F), but can be assisted by an OBS-ROV (observation mini-submarine) if necessary. The advantage of this is to have good control of the surrounding arrangement, seabed and equipment and to minimise damage and loss of the harvesting unit. The pumps (1) can be frequency controlled and the pump motor can be designed to be pressure compensated so that it is able to resist the hydrostatic pressure to which the harvesting unit is subjected since the shellfish can be found at depths as great as 200 metres. The advantage of frequency-controlled pumps is that the operator can control the pump suction and thus the force that acts on the shellfish and the seabed. The frequency control of the pump will thus help to limit the scope of damage to the seabed. The pumps can be of the ejector type, of a type having a large spiral casing with high flow and low pressure, with impellers that are so-called "contactless" and gentle on the product that is pumped, or of other suitable types of pumps.

In an embodiment, the invention comprises towlines (51) such as, for example, wire, rope, chain or the like, which run between the main frame (6) and winches (V). The winches (V) can be arranged on a vessel (F) that is further adapted to carry the harvesting unit (0). The harvesting system will be suspended in the towlines (51) and will capable of being pulled behind the vessel at a forward speed of about 2 knots during the harvesting operation. As fishing vessels it is possible to use an Offshore Service Vessel (OSV), Platform Supply Vessel (PSV) or fishing vessels suitable for the purpose.

In an embodiment of the invention the sorting device (3) comprises a first sorter (3a) that is designed to separate shellfish from bycatch and a second sorter (3b) designed for size sorting of, for example, shellfish. Bycatch can, for example, consist of rocks, seaweed and dead vegetation. A first size sorting of shellfish will be desirable in order to distinguish between shellfish of a desired size and shellfish below the desired size. Minimum shell height for scallops that may be harvested is 65 mm. I.e., the separator will be able to have several stages, where a first stage sorts out as many undesired objects as possible, such as small rocks, dead vegetation etc. The unwanted objects are not collected but are ejected from a first sorter (3a) and back into the sea. It is advantageous to be able to separate out as much of the bycatch as possible on the seafloor. A next stage in a separator device may then be that it can sort shellfish according to size, so that shellfish under the minimum size can be released. It is an advantage to put the small shellfish back into their original biotope and thus cause minimum damage and "dead sea". If desirable, the shellfish it is desired to take up can also be sorted according to size, but a sorting of this kind can also be done on board the vessel.

In an embodiment of the harvesting system, the harvesting unit (0) can comprise a third sorter (3c) designed for a further size sorting, i.e., to distinguish between, for example, Iceland scallops of different desired sizes. The third sorter (3c) can be arranged in the harvesting unit (0). It may be advantageous to be able to distinguish directly in the harvesting unit between these shellfish sizes that are to be delivered to different markets, customers and quality.

In an embodiment of the harvesting system, it can comprises an additional sorter (3d) that is positioned on the vessel (F). This sorter (3d) will be suitably located on the deck of the vessel (F). It is advantageous to have this sorter (3d) on deck where it is readily available with a view to access, emptying of catch and service friendliness. There can also be situations where it is practical or appropriate to have a further sorting on the deck of the vessel in order to carefully sort the shellfish so as to simplify the packing and packaging process for the catch. It is not necessary for this sorter to be a fourth sorter but it could well replace one or more sorting stages which are arranged on the harvesting unit (0) operating on the seabed.

The sorting devices for separating Iceland scallops from bycatch comprise mechanical sorting, optical imaging and image analysis, ultrasound transmitter and receiver, ultrasound image analysis, for example, Doppler, acoustic impedance, size measurement and using multiple ultrasound transmitters and multiple ultrasound sensors.

In an embodiment of the harvesting system, the collecting unit (4) is a separate unit that is separated from, and connected to, a pump (1) and the separator unit (3).

In an embodiment of the harvesting system the collecting unit (4) is provided with wire mesh, grating or netting (41) in its walls and bottom. The collecting unit can be configured in many different ways, such as, for example, a box with drainage, a box with slots, perforations, netting, wire mesh, grating or solid walls. The advantage of these devices is that they can carry out a final sorting of the catch and discard minor contaminants that were not detected in the earlier sorting devices (3a-3d). The said separators will, in principle, be able to use size, specific gravity and gravitational forces, optical imaging and image analysis, mechanical sorting, ultrasound analysis (Doppler, acoustic impedance, size measurement) or utilisation of multiple ultrasound transmitters in order to sort undesired objects from desired catch.

It is advantageous to have the collecting unit (4) arranged in such a way that it can be emptied in a simple and efficient manner. In order to be able to lift the collecting unit (4) from the harvesting unit (0) up to the deck of the vessel (F), it is configured with lifting devices (L) such as eyebolts or lifting eyes.

In an embodiment of the invention, the collecting unit (4) is arranged with lifting devices (L) to be connected to a coupling device (K) in the towing and launching system (5) for separate lifts of the collecting unit (4). The advantage of this is that the operator can lift and empty a dedicated collecting unit (4) (in this case a basket) whilst the other baskets are in production on the seabed, thereby preventing stoppages and allowing continued collection of shellfish. In addition, it means there is less equipment and weight that has to be moved from the seabed up to the vessel, thus reducing the risk of potential damage to more equipment than absolutely necessary.

In an embodiment of the invention, the collecting unit (4) can be emptied by the towing and launching system (5) lifting the whole harvesting unit (0) up to the deck of the vessel (F). In this way, the whole harvesting unit (0) is lifted and placed on the deck of the vessel, making it very easy to manipulate, handle and empty the collecting unit (4) locally and allowing the operator to have a good overview of the situation.

In an embodiment of the invention, the collecting unit (4) can be emptied when a given level is reached in the collecting unit (4), or emptied continuously and the sorted shellfish are transported up to the deck of the vessel (F) by means of a separate pumping and transport system (7). It may be advantageous to introduce a continuous process with a pumping and transport system that empties the collecting unit (4) at a given transport rate. The shellfish harvesting efficiency will increase and an unnecessary emptying process of the collecting unit (4) will also be prevented, which contributes towards shorter interruptions or stoppages during the harvesting operation.

In an embodiment of the invention, the main frame can be arranged with at least one camera (53) connected directly or indirectly to a control and monitoring unit (58) on the vessel (F) or the harvesting unit (0). Such camera monitoring will give the operator of the harvesting device an overview of the fishing area, and also gives the operator decision support during the harvesting operation.

In an embodiment of the invention, the harvesting system can further comprise a positioning system (50) arranged at least on the harvesting device (0) for control, monitoring and indication of the position of the harvesting unit (0) relative to the seabed. This can simplify control of the harvesting unit and reduce the strain on the operator during the operation.

In an embodiment of the invention, the positioning system (50) can comprise sensors (52) arranged at least on the harvesting unit (0) for indication of the position of the harvesting unit (0) relative to the seabed. This can be advantageous as it enables the operator to know where the harvesting unit (6) is and simplifies control from the positioning system (50).

In an embodiment of the invention, one or more of the pumps (1) comprise a suction adjustment system (14) capable of individually or jointly adjusting the suction that is adapted to the characteristics of the seabed. The pump is speed controlled from the suction adjustment system (14) that can be programmed to adapt to different seabed conditions. Optimal flow amount through each separate pump is reckoned to vary between 0-1.0 m3/s. Another variant of a suction adjustment system can be one where the pumps are allowed to run at a constant rate whilst the channels into the pumps are merely shorted. This is a simplified system.

In an embodiment of the invention, one or more suction nozzles (2) can be arranged to be raised or lowered so as to be adapted to the seabed topology. In an embodiment, video images and manual control from the vessel are used. In an embodiment, this can be controlled via sensor and image recognition technology. The suction nozzle (2) can be provided with a substantially horizontal channel (21) having a slit facing the seabed, and which is connected at the bottom edge of one or more suction nozzles (2).

In an embodiment of the invention, the suction nozzle (2) can be arranged to be raised and lowered relative to the structural main frame (6) with the aid of hydraulic or electric actuators (22). It is also possible to use a pulley/wire/motor arrangement (23) for this purpose. This simplifies the way in which each individual nozzle can be adjusted and positioned according to the characteristics of the seabed topology. This will be achieved with the aid of cameras or sensors that are arranged at different points on the harvesting unit and which provide feedback to a control system that is connected to the suction nozzle actuators.

In an embodiment of the invention, the vessel (F) can comprise an A frame (A) that is arranged on the rear part of the vessel (F) for support of the towing and launching system (5). The harvesting tool will be attached to the vessel (F) by means of an A frame that is an "overboarding" or launching system. The A frame will have movable rope blocks according to how many modules the harvesting unit is configured with. The A frame can be positioned quite far in on the vessel so as to be able to land the harvesting unit safely on the deck, and can in practice be almost as wide as the breadth of the vessel. This is advantageous for facilitating unloading and loading of the harvesting unit (0). At the same time, this solution gives minimal limitations as regards the size of the harvesting unit (0).

In an embodiment of the invention, the vessel (F) can comprise a moonpool (M) for deployment and retrieval of the harvesting unit (0). The moonpool is an opening located in the deck of the vessel through which the harvesting unit can be raised from and lowered to the seabed. This is an advantage in unfavourable weather conditions when the harvesting unit is to be loaded or unloaded and will substantially increase the weather window.

In an embodiment of the invention, the winch (V) can further comprise a heave compensation system (57) for adjusting the position of the harvesting unit (0) relative to the seabed. The heave compensation system (57) can also be arranged to be suspended in an A frame (A) or mounted between the winch (V) and the A frame (A). It may be advantageous for the towing system (5) to comprise: fixed or laterally movable rope blocks (58) for guiding the lines (53), and hydraulic or electric actuators for positioning and landing the harvesting unit on the deck of the vessel. With the aid of heave compensation, it will maintain a steady distance from the seabed and with an integrated camera there will be a good overview of the environment and surroundings. The advantage of the heave compensator system is based on there being a low mass and low rotational inertia in the system. A heave-compensated winch will also be advantageous in order to reduce the number of days when harvesting is not possible due to unfavourable weather conditions, i.e., the weather window is substantially increased. Another advantage is that the winches (V) on the vessel (F) are able to operate under different reference points to the seabed should it be necessary with regard to broken terrain, such as slopes, rocks, debris etc. In an embodiment, the winch itself can heave compensate by rotating the winch drum in counterphase to the heave motion.

In an embodiment of the invention, the towing and launching system (5) can comprise a line (53) that constitutes or comprises an umbilical cable (54) with power transmission from the vessel (F) to the harvesting unit (0). This umbilical cable (54) functions both as a line (or lifting cable) and a power transmission and signal cable for the harvesting unit (0). In the winch (V) there will be a slip ring for transmission of electric power to the harvesting unit (0). It will also be possible to transmit live images from the camera (55) on the harvesting unit (0) through this slip ring. Alternatively, the harvesting unit (0) can be equipped with a separate energy source, for example, a subsea battery pack to allow autonomous operation.

In an embodiment of the invention, the harvesting unit (0) comprises vertical and/or horizontal thrusters (59) that are designed to finely adjust or support the positioning of the harvesting unit (0) relative to the seabed. It is advantageous for the harvesting system if the vertical or horizontal thrusters (59) are able to independently position the harvesting unit (0) in, respectively, the x-axis, the y-axis and/or the z-axis, depending on the characteristics of the seabed. This will render the harvesting activity more efficient.

In an embodiment of the invention, there will be a control and monitoring system (58) which will be designed to adjust at least one or more of the following components: the suction adjustment system (14), the actuators (22), the positioning system (50), and/or the thrusters (59). The harvesting system can advantageously be managed, monitored and controlled in its entirety from the vessel (F). The harvesting efficiency of the harvesting unit will be affected by two main parameters: the individual density of the shellfish and the characteristics of the seabed. To obtain optimal harvesting efficiency, it is necessary to be able to chart the shellfish stock in the area where harvesting is to take place ahead of the fishing operation. By using one or more cameras (55) and light sources (56) that are mounted on the harvesting unit (0), the operator or control system will have an advance picture of the nature of the seabed topography and the location of concentrations of shellfish on the seabed. Here, image recognition can be used, where sensors (52) are mounted at different points on the harvesting unit (0) and are able to scan the seafloor and the area from where shellfish are to be harvested, for example, 0-50 metres further ahead (so-called predictive image analysis). Based on this gathered information, the operator or the control system can decide or predict (visually or via algorithms) which way or direction the harvesting system should move to maximise the harvesting. At the same time, this will allow the operator to see or receive information if the seabed consists of sensitive flora/coral that can be avoided in order to prevent needless negative impact on the environment. In the charting and harvesting phase, the control and monitoring system (58) can process and register the coordinates of the harvesting unit (0) during the operation (for example, via a GPS, tracker or other positioning device) such that it is stored thereby avoiding harvesting in the same place at a later time. Documentation of where the harvesting unit (0) has been can also be a requirement set by the fishery authorities as a part of the harvesting concession and reporting.

In an embodiment, the harvesting unit (0) will be modular and the system will consist of several juxtaposed identical modules and will be able to cover large breadths of the seabed as several units can be run in parallel. This will in practice have no limits where weight is concerned. If there is a need for buoyancy due to the weight of the harvesting unit (0), the units can be equipped with buoyancy elements. Since each unit is a self-sufficient unit, the harvesting unit will be capable of being modularly configurable according to the bottom conditions, production capacity and the capacity of the vessel.

The invention claimed is:

1. A harvesting system for shellfish comprising a harvesting unit comprising the following features:
   one or more pumps comprising:
      one or more suction nozzles directed towards the seabed,
      one or more inlets that lead from the suction nozzle to the pump,
      an outlet to a sorting device;
   one or more motors for driving the one or more pumps, where the sorting device, which at least separates shellfish from bycatch and foreign bodies, has an outlet for shellfish leading to a collecting unit;
   a structural main frame that carries at least the harvesting unit; and
   a towing and launching system for deployment and propulsion of the harvesting unit.

2. The harvesting system according to claim 1, wherein the towing and launching system comprises:
   towlines running between the main frame and winches, wherein the winches furthermore are arranged on a vessel designed to carry the harvesting unit.

3. The harvesting system according to claim 2, wherein the winches further comprise the following feature:
   a heave compensation system for adjusting the position of the harvesting unit relative to the seabed.

4. The harvesting system according to claim 1, wherein the sorting device comprises:
   a first sorter designed to separate shellfish from bycatch;
   a second sorter designed for size sorting of shellfish.

5. The harvesting system according to claim 4, wherein the harvesting unit further comprises:
   a third sorter designed for further size sorting; and
   where the third sorter is arranged in the harvesting unit.

6. The harvesting system according to claim 1, wherein an additional sorter is positioned on a vessel.

7. The harvesting system according to claim 1, wherein the collecting unit is a separate unit, separated from, and connected to, the pump and the separator unit.

8. The harvesting system according to claim 1, wherein the collecting unit is provided with wire mesh, grating or netting in its walls and bottom which affects a sorting of the catch.

9. The harvesting system according to claim 1, wherein the collecting unit is provided with lifting devices for connection to a coupling device in the towing and launching system for separate lifting of the collecting unit.

10. The harvesting system according to claim 1, wherein the main frame is provided with at least one camera connected directly or indirectly to a control and monitoring unit on the vessel or the harvesting unit.

11. The harvesting system according to claim 1, wherein the harvesting system further comprises a positioning system arranged at least on the harvesting unit for control, monitoring and indication of the position of the harvesting unit relative to the seabed.

12. The harvesting system according to claim 11, wherein the positioning system comprises sensors arranged at least on the harvesting unit for indication of the position of the harvesting unit relative to the seabed.

13. The harvesting system according to claim 11, wherein a control and monitoring system is designed to adjust the positioning system.

14. The harvesting system according to claim 1, wherein the one or more pumps further comprise a suction adjustment system capable of individually or jointly adjusting the suction that is adapted to the characteristics of the seabed.

15. The harvesting system according to claim 1, wherein the one or more suction nozzles are designed to be raised and lowered to be adapted to the topology of the seabed.

16. The harvesting system according to claim 1, wherein the suction nozzle is designed to be raised and lowered relative to the structural main frame with the aid of hydraulic or electric actuators or a pulley/wire/motor device.

17. The harvesting system according to claim 1, wherein a vessel comprises a frame arranged on the rear part of the vessel for support of the towing and launching system.

18. The harvesting system according to claim 1, wherein a vessel comprises a moonpool for deployment and retrieval of the harvesting unit.

19. The harvesting system according to claim 1, wherein the towing and launching system comprises a line that constitutes or comprises an umbilical cable with power transmission from the vessel to the harvesting unit.

20. The harvesting system according to claim 1, wherein the harvesting unit comprises vertical and/or horizontal thrusters designed to finely adjust or support the positioning of the harvesting unit relative to the seabed.

21. The harvesting system according to claim 1, wherein the system consists of multiple juxtaposed identical modules.

22. A method for harvesting shellfish from a seabed, comprising the following steps:
- lowering a harvesting unit from a vessel via a towing and launching system down to the seabed;
- sucking up shellfish via one or more suction nozzles directed towards the seabed using one or more pumps that are arranged in the harvesting unit;
- separating shellfish from bycatch and foreign bodies using sorting devices;
- passing the shellfish to a collecting unit;
- towing the harvesting unit along the seabed by means of the towing and launching system, and further,
- controlling and adjusting the position of the suction nozzles, the position of the harvesting unit relative to the seabed and required suction force or flow from the pumps as a function of the harvesting rate.

23. The method according to claim 22, wherein the harvesting unit is controlled and adjusted by means of a control and monitoring unit that is arranged on the harvesting unit or the vessel.

\* \* \* \* \*